C. C. CLAYBERG.
AUTOMATIC COMPENSATING MECHANISM FOR DIFFERENTIAL DRIVING SYSTEMS OF AUTOMOBILES.
APPLICATION FILED JAN. 13, 1916.
1,207,501.
Patented Dec. 5, 1916.
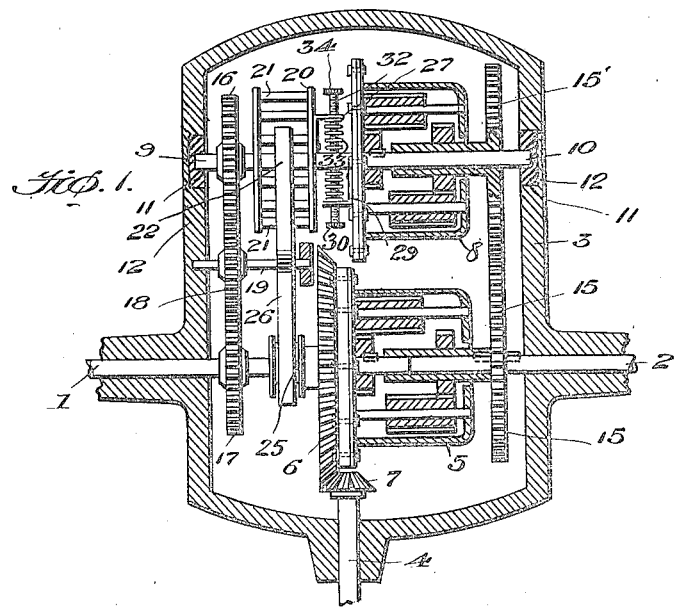
Inventor
Clarence C. Clayberg

UNITED STATES PATENT OFFICE.

CLARENCE CHARLES CLAYBERG, OF MILL CITY, OREGON.

AUTOMATIC COMPENSATING MECHANISM FOR DIFFERENTIAL DRIVING SYSTEMS OF AUTOMOBILES.

1,207,501.  Specification of Letters Patent.  Patented Dec. 5, 1916.

Application filed January 13, 1916. Serial No. 71,940.

*To all whom it may concern:*

Be it known that I, CLARENCE C. CLAYBERG, a citizen of the United States, residing at Mill City, county of Marion, and State of Oregon, have invented certain new and useful Improvements in Automatic Compensating Mechanism for Differential Driving Systems of Automobiles, of which the following is a specification.

This invention relates to automatic compensating mechanism for differential driving systems of automobiles.

I do not confine the use of this invention to automobile rear-axles for it is adapted to be used wherever similar results are desired, but I will confine my description to use on an automobile driven by the two rear wheels.

The ordinary differential gearing used on the rear axles of automobiles, tractors and other mobile power driven vehicles has no means whereby practically all the driving power may be applied to the drive-wheel retaining traction when the other wheel slips on ice, snow, or any slippery substance, or loses traction by being held off the ground by frame of car as when over deep hole, ditch, crowned road, etc. Under such conditions, the wheel which slips, or is held off the ground enough to lose traction, spins or "races" while the wheel retaining traction has practically no rotary power applied to it.

The object of my invention is to provide a novel automatic compensating mechanism adapted to overcome the foregoing defect and, while allowing the ordinary differential mechanism to perform all of its usual functions by driving both wheels at equal speed or slowing up of the pivot wheel when turning a curve, will cause practically all the power from the engine to be automatically transmitted to the wheel which retains traction so that it is given extra tractive effect and will drive the vehicle until the wheel which is slipping again obtains traction, but as soon as the wheel which has slipped obtains traction, power will be automatically transferred to that wheel also, so that each wheel will then take up its proportionate and proper share of the desired tractive action.

In carrying out my invention, I have entirely eliminated clutches, dogs, latches or other devices adapted to be manually operated or any device that locks the drive shafts rigidly together and have provided a purely automatic mechanism.

One embodiment of my invention is set forth hereinafter, but modifications thereof may be resorted to in carrying out the essential principles of the mechanism.

In the accompanying drawings:—Figure 1 is a plan view with the case in section; Fig. 2, a detail perspective of the spring connection; Fig. 3, a detail of the escapement mechanism; Fig. 4, a detail of one of the brackets and Fig. 5, a detail vertical section of one of the bearings.

The two rear axles of the vehicle are shown at 1 and 2 and the stationary case which incloses all of the mechanism appears at 3. The drive shaft which is operated by the engine or motor appears at 4.

The rotary gear case of the primary or ordinary differential is shown at 5. Any desired gearing may be employed inside this case, as the interior differential gearing does not constitute a material part of the present invention. The gear case is positively driven by the bevel gear 6 secured thereto which meshes with the pinion 7 on the drive shaft 4.

The rotary case of the secondary differential is shown at 8 and contains differential gearing whose exact form is not material, as any of the ordinary differentials may be employed. Like the primary differential, this case is adapted to rotate and the gears therein are controlled by the respective shafts 9 and 10 which are mounted in the stationary case 3, just as the shafts 1 and 2 are mounted in said case. I prefer, however, to provide as a bearing for the shaft 9, the spring bearing 11 shown in Figs. 1 and 5, said bearing constituting a bearing block which is slidable in a slot 12 in the case 3 and is held in position, subject to up and down oscillation, by coil springs 13. This bearing will prevent any binding of the escapement mechanism hereinafter described; but without permitting disengagement of gears 16 and 18.

The shafts 2 and 10 are directly connected by intermeshing spur gears 15 and the shafts 1 and 9 are connected by spur gears 16 and 17 which mesh with an intermediate idler pinion 18 so that the rotation of shafts 1 and 9 is always in the same direction, whereas shafts 2 and 10 rotate in opposite directions. The idler pinion 18 may be mounted on a shaft or stud 19.

The gear ratio is such that when the car is moving straight ahead, the primary differential case 5 and drive shafts 1 and 2, also gears 17 and 15, all move as a unit, the gears 16 and 15' move in opposite directions, and the gear case 8 remains stationary. Should shaft 1 and gear 17 move faster than shaft 2 and gear 15, the gear-case 8 would rotate in one direction, but if shaft 2 and gear 15 should move faster than shaft 1 and gear 17 the case 8 would rotate in the opposite direction, and amount of rotation of case 8 would be in proportion to the difference of rotation between shafts 1 and 2.

Loose on the shaft 9 is an escapement wheel 20 of the squirrel cage type, the pins or teeth thereof being preferably provided with antifriction rollers 21. Pivoted on the stud 19 is a double two-way escapement lever 22 whose teeth 23 and 24 are adapted to alternately enter the interdental space between the rollers 21. Secured rigidly to the gear 6 or to the case 5 is an eccentric sheave 25 which always turns with the gear case 5 and is consequently a part of the drive line from the engine. The two-way escapement lever 22 has a yoke 26 which engages the cam sheave 25 and the said escapement lever is continuously oscillated by said cam sheave as the gear case 5 rotates, thus allowing the wheel 20 to "escape."

As the escapement lever 22 is operated by eccentric 25, which is rigidly connected to gear 6 and case 5, it can oscillate only one complete cycle every revolution of the case 5. The teeth 23—24 enter between pins of wheel 20 so that every time a half cycle is completed the roller 21 under one of the teeth (23 or 24) can move in whichever direction the gear case 8 is pressing; with an intermittent motion the case 8 can move in either direction, as the pressure from axles 1 and 2 may determine, excepting that it cannot move faster than the escapement lever 22 permits the wheel 20 to escape between the teeth (23—24). By proper shaping of the teeth 23—24, the intermittent motion above described, can be made almost a continuous even motion.

The two-way escapement herein described permits the case 8 to remain stationary, or to rotate in either direction up to a certain speed, that speed being determined by the number of oscillations of the escapement lever 22 and the number of pins in the squirrel cage wheel 20. To permit relative idling movement of the wheel 20 when the vehicle is moving straight ahead, there is provided a yieldable connection between the wheel 20 and the gear case 8, the details of which appear in Figs. 1 and 2. Secured to the side of the gear 20 is an angle bracket 27 having slots 28. Fastened to the side of the gear case 8 is an angle bracket 29 having stop screws 30, threaded apertures 31 which receive the ends of stop screws and ends of screw-threaded rods 32 which are surrounded by coil springs 33 interposed between the outstanding parts of angle brackets 27 and 29, on said screws 32 extending through the slots 28. By suitable adjustment of the stop screws 30 and the screws 32, the slotted bracket 27 will strike a stop screw and a head 34 of a screw 32 at the same time on opposite sides of the shaft 9. The device described permits the escapement wheel 20 to idly oscillate back and forth on shaft 9 without moving the gear case 8, when there is no reason for differential movement between shafts 1 and 2.

When the automobile or vehicle is moving directly ahead, the shafts 1 and 2 and rotary gear case 5 are driven as a unit, the shafts 9 and 10 then revolving in opposite directions to each other and the gear case 8 remaining stationary. The revolutions of case 5 and eccentric 25 merely cause the escapement lever 22 to vibrate without active effect on case 8, inasmuch as the spring connection between the wheel 20 and case 8 permits a sufficient idle rocking of the wheel 20.

If one of the traction wheels driven by shafts 1 and 2 should slip or lose traction for any reason, the balance on which all differential action depends would be disturbed; the shaft 1 or 2 opposing the least resistance to the driving force of the car would move faster than its mate; the operative connecting gearing 15—15' and 16, 17, 18 would cause corresponding shafts 9 and 10 of the secondary differential system to move at corresponding variation of their ordinary speed. The balance of secondary differential system, resulting from the equal and opposite rotation of shafts 9 and 10 would be disturbed and the case 8 would be rotated, but at a speed not more than that allowed by the two-way escapement mechanism.

The escapement mechanism allows the case 8 to rotate in either direction up to a speed in direct ratio to the speed of the drive shaft of car, that ratio being made so that it will allow the variation of axles 1 and 2 only sufficient to turn car in the radius car is designed to turn in. When the slipping wheel regains traction, the balance of the differential systems, primary and secondary, is automatically restored. Similarly, in turning a corner, or turning the automobile around, when one traction wheel is rotating faster than the other, the same automatic compensation takes place.

The interposition of the stops and yielding connection between the wheel 20 and case 8 insures a smooth movement while turning within the prescribed radius, and an almost steady movement while driving entirely on one wheel. Also, the escapement wheel must move a trifle on every vibration of the escapement lever 22 and the aforesaid spring connection entirely takes up such movement when the vehicle is traveling straight ahead.

Having thus described my invention, what I claim as new and desire to secure by Letters Patent, is:—

1. In an automatic compensating differential driving system, the combination with a primary self-contained, rotary differential and axles driven thereby, of a secondary self-contained, rotary differential and operative connections between the secondary differential and the axles and a controlling device between said differentials, whereby the secondary differential is adapted to automatically coöperate with the primary differential for driving purposes either forward or backward when the axles of the primary differential tend to rotate at a greater variation of speed than what is required in the turning radius of car.

2. In an automatic compensating differential driving system, the combination with driving means therefor, of a primary self-contained, rotary differential and axles driven thereby, of a secondary self-contained, rotary differential and operative connections between the secondary differential and the axles, and means controlled by the driving means of the system adapted to automatically render the secondary differential active for driving purposes either forward or backward when the axles of the primary differential tend to rotate at a greater variation of speed than what is required in the turning radius of car.

3. In an automatic compensating differential driving system, the combination with driving means therefor, of a primary differential and axles driven thereby, of a secondary differential and operative connections between the secondary differential and the axles, and a two-way escapement lever and wheel controlled by the driving means of the system adapted to govern the coöperation of the primary and secondary differentials.

4. In an automatic compensating differential driving system, the combination with a primary rotary differential and axles driven thereby, of a secondary rotary differential, axles therefor, a controlling device for the secondary rotary differential, and gearing connecting the respective axles of the primary differential with the respective axles of the secondary differential adapted to cause the axles of the secondary differential to be driven in opposite directions to each other, thereby controlling the rotation of the secondary differential.

5. In an automatic compensating differential driving system, the combination with driving means therefor, of a primary self-contained, rotary differential and axles driven thereby, of a secondary self-contained, rotary differential, axles therefor, gearing connecting the respective axles of the primary differential with the respective axles of the secondary differential adapted to cause the axles of the secondary differential to be driven in opposite directions to each other, and means controlled by the driving means of the system adapted to govern the operation of the secondary differential.

6. In an automatic compensating differential driving system, the combination with driving means therefor, of a primary self-contained, rotary differential and axles driven thereby, of a secondary self-contained, rotary differential, axles therefor, gearing connecting the respective axles of the primary differential with the respective axles of the secondary differential adapted to cause the axles of the secondary differential to be driven in opposite directions to each other, and an escapement wheel and lever controlled by the driving means of the system adapted to limit the rotation of the secondary differential case.

7. In an automatic compensating differential driving system, the combination with driving means therefor, of a primary differential and axles driven thereby, of a secondary differential, axles therefor, gearing connecting the respective axles of the primary differential with the respective axles of the secondary differential adapted to cause the axles of the secondary differential to be driven in opposite directions to each other, an escapement wheel carried on one of the axles of the secondary differential, a yielding operative connection between said wheel and the secondary differential case, and a two-way escapement lever coöperating with said escapement wheel and itself controlled by the driving means of the system.

8. In an automatic compensating differential driving system, the combination with driving means therefor of two self-contained, rotary differentials, a connecting gearing therefor, a two-way escapement mechanism adapted to limit the rotation of one differential and itself automatically controlled from the driving means forward of where compensation occurs.

In testimony whereof, I hereunto affix my signature.

CLARENCE CHARLES CLAYBERG.